Patented Nov. 7, 1933

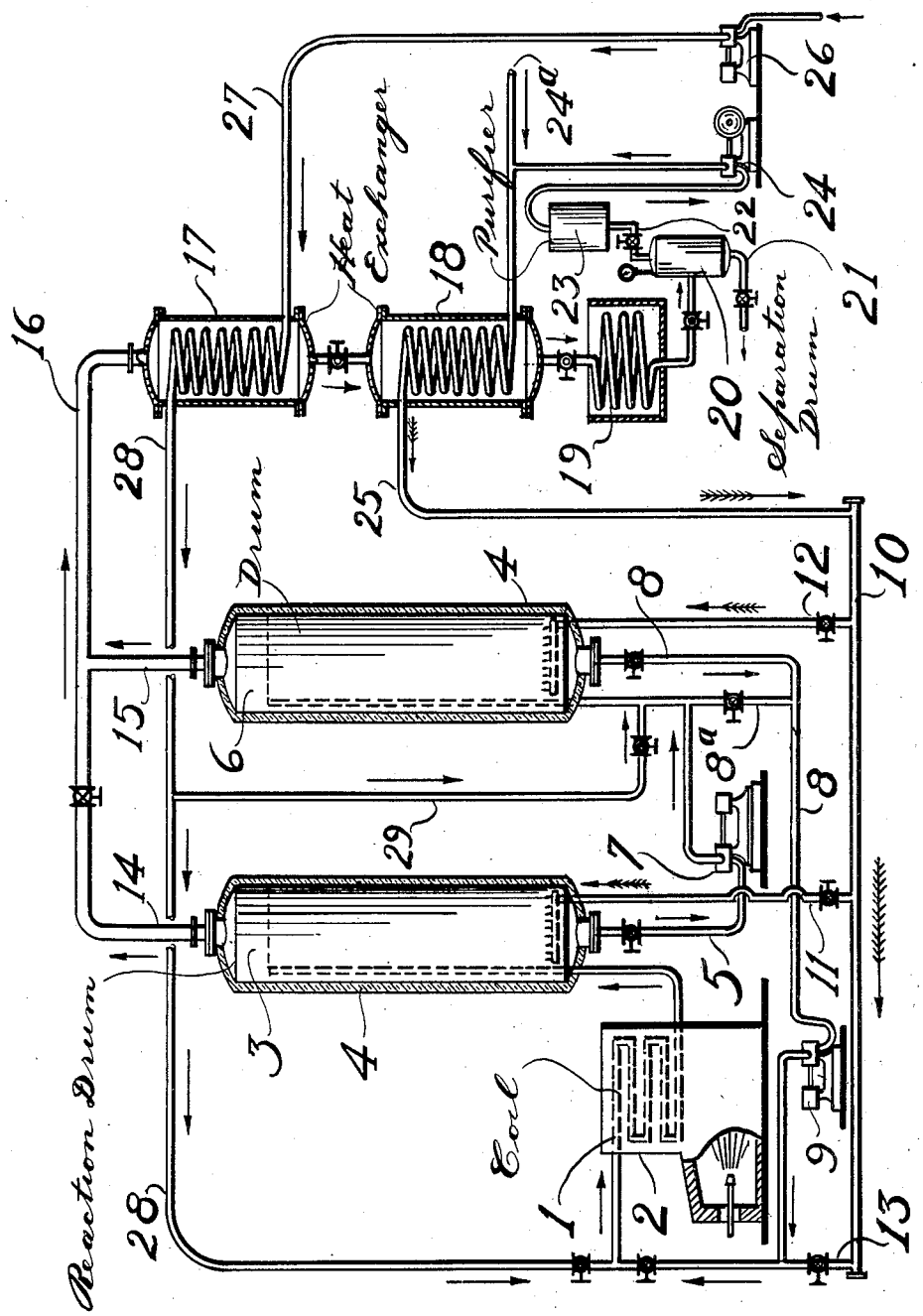

1,934,054

UNITED STATES PATENT OFFICE 1,934,054

PROCESS FOR PRODUCING HIGH-GRADE MOTOR FUELS FROM HEAVIER CARBONACEOUS MATERIAL

Edwin J. Gohr, Baytown, Tex., assignor to Standard-I. G. Company

Application September 19, 1929
Serial No. 393,646

9 Claims. (Cl. 196—53)

The present invention relates to an improved process for producing valuable low-boiling distillates from higher boiling materials and more specifically an improved process for the production of high-grade naphtha suitable for motor fuel from heavier oils thru the action of hydrogen at high pressure and high temperature. My invention will be fully understood from the following description and the drawing which illustrates an apparatus in which my process may be satisfactorily carried out.

The drawing is a semi-diagrammatic view in sectional elevation of an apparatus constructed to operate in accordance with one modification of my invention.

In the destructive hydrogenation of heavier hydrocarbon oil particularly for the production of light naphtha suitable for motor fuels, it has been noted that more elevated temperatures are more desirable since the oil produced is thereby endowed with marked anti-detonating characteristics. I have observed, however, that as the temperature rises over about 850° F. in a liquid phase operation, there is a slow but steady accumulation of heavy material, the nature of which is not completely understood, but which will be called "asphalt" for convenience. The term "asphalt" is used to represent those solid components which may be removed from suspension in oil by filtration or other physical means, and which are insoluble in naphtha but soluble in benzol. This tendency to "asphalt" formation may be controlled to some degree by the use of relatively large proportion of catalyst to oil, by the use of higher hydrogen pressure but more complete saturation of the lighter oils generally occurs simultaneously. My present method is adapted to operate at temperatures above 850° F. and to eliminate this "asphalt" accumulation and at the same time produce anti-detonating naphthas without undue loss by gas formation.

Referring to the drawing numeral 1 denotes a coil arranged in a setting 2 and adapted to heat a stream of oil to a temperature in excess of 900° F. The coil discharges into a reaction drum 3 which is protected against loss of heat by suitable means, for example an insulating cover 4. Liquid material is removed from drum 3 by line 5 which communicates with a second drum 6 which may be similar in design to drum 3 and which is adapted to withstand pressures in excess of 200 atmospheres and the corrosive effects of hydrogen and oil at high temperatures. A pump 7 may be used in line 5 when the drums are operated at equal pressures but may be omitted when drum 6 is maintained at a pressure below drum 3. Line 8 removes liquid oil from drum 6 and returns it to the inlet of coil 1 for recirculation and pump 9 is provided to force the oil through the line. It is not necessary that all of the oil from drum 3 go to drum 6 and part may be by-passed to line 8 by means of a valved by-pass 8ª.

Hydrogen or a gas rich in the same is supplied to the reaction drums 3 and 6 from a manifold 10 by means of lines 11 and 12 respectively and hydrogen is also added to the oil flowing through coil 1 by means of a branch pipe 13. Vapor is removed from each drum by vapor lines 14 and 15 and there may be manifolded into a common pipe 16 which communicates with heat exchangers 17 and 18 and condenser 19. Condensate and gas are discharged into a separation drum 20 from which liquid is removed to storage (not shown) by line 21. Uncondensed gas flows by line 22 to a purifier 23 which may comprise a system for scrubbing the gas with oil to remove or partially remove hydrogen sulphide and hydrocarbon constituents. Purified gas is compressed by booster 24 and forced through exchanger 18 for preheating and thence by line 25 to manifold 10. Fresh or make up hydrogen may be added under full pressure by line 24ª.

The fresh oil which may be a crude, reduced crude, heavy distillate oil or the like is forced by pump 26 through line 27 to exchanger 17 and thence by line 28 to the inlet of coil 1. Part of the oil may be passed directly into drum 6 by means of branch pipe 29.

In the operation of my process drums 3 and 6 may be packed with suitable catalytic material, in coarse lumps such as the oxides, sulphides and other compounds of heavy metals, such as molybdenum, chromium and the like or these mixtures with other metal oxides, such as zinc, aluminum or the rare earths. Such catalysts are resistant to sulfur and are suitably classified as sulfactive. I prefer, however, to suspend the catalyst in the oil in a finely ground condition and to allow it to circulate through the drums, coil and the circulation lines. Drum 3 is maintained at a temperature in excess of 850° F. and preferably about 890° or higher under pressure of 200 atmospheres or higher although pressure may be as low as about 50 atmospheres. These conditions will be designated as "asphalt" increasing conditions. The second drum 6 is preferably maintained at the same or even higher pressure but at a temperature below 850° F. and preferably about 800°

F., which conditions are designated as "asphalt" reducing conditions. To maintain this temperature it may be desirable to provide a small heating coil in line 5 but this is ordinarily not required. Drum 6 may be held at a pressure somewhat below drum 3, say 20 to 50 atmospheres and in such case a valve will be substituted for pump 7, as will be understood, for regulation.

The volume of catalyst, in finely ground form, is generally about 20% by volume of the oil but less may be used, or more, it being understood that at higher temperatures in drum 3 a greater proportion of catalyst to oil is desirable. The volume of hydrogen circulated is greatly in excess of that actually combining with the oil or its impurities and is ordinarily in excess of about 5000 cu. ft. of hydrogen per barrel of oil fed.

Although only two drums are shown for illustrative purposes, it should be understood that a single drum such as 6 may serve a plurality of drums such as 3 since it is not necessary that all of the oil from drums 3 be passed through drum 6. One satisfactory method of operation is to use the by-pass line 8ª for the majority of the oil and to withdraw only enough to drum 6 to keep the asphalt content down to a suitable figure. For example, using 20% catalyst by volume, it is desirable to hold the asphalt content of the oil in drum 3 to 15% or less and drum 3 may be maintained well over 850° F. The purpose and function of drum 6 are to eliminate "asphalt" or to greatly reduce its proportion in the oil. With larger proportion of catalyst, the asphalt content of the oil in drums 3 may also be greater as disclosed in a prior application by James M. Jennings, now U. S. Patent 1,894,770, issued January 17, 1933.

The major quantity of light oil is produced from drum 3 and it comprises 20 to 50% of an oil boiling below about 400° F. which has excellent anti-detonation characteristics. The light oil from drum 6 is not so good from an anti-knock standpoint but it is relatively small in volume and may be blended with the high-grade distillate and still produce an excellent motor fuel for high compression engines. The balance of the distillate may be returned to the system or may be cracked in apparatus suitable for that purpose. The recovery of liquid materials is generally slightly over 100% by volume of the feed and the yield of naphtha is considerably greater than can be obtained by ordinary cracking methods.

My invention is not to be limited by any theory of the mechanism of my process nor to any particular means by which I have illustrated its performance but only by the following claims in which I wish to claim all novelty inherent in my process.

I claim:

1. Process for the production of motor fuels by the destructive hydrogenation of relatively heavier hydrocarbon oils at pressures above about 50 atmospheres, and temperatures in the upper portion of the range suitable for destructive hydrogenation under intense destructive hydrogenation conditions, to form both motor fuels and "asphalt", withdrawing a portion of the reactants containing said "asphalt", reducing the "asphalt" content of said portion and then returning the said portion to said destructive hydrogenation step.

2. Process for the production of motor fuels by destructive hydrogenation of heavy petroleum oils at pressures above about 50 atmospheres and temperatures above about 850° F. under intense destructive hydrogenation conditions to form both motor fuels and "asphalt", withdrawing a portion of the liquid reactants containing "asphalt", subjecting said portion separately to limited destructive hydrogenation at a reaction temperature below about 850° F. and a pressure above about 20 atmospheres under intense hydrogenation conditions to reduce "asphalt", and returning the resulting heavy products from said second treatment to said first destructive hydrogenation.

3. In a process for the production of anti-detonating motor fuels by destructive hydrogenation of heavy petroleum oils in liquid phase at a pressure above about 50 atmospheres and a temperature in the upper portion of the range suitable for destructive hydrogenation, whereby motor fuels and "asphalt" are simultaneously formed, an improved method of operation comprising continuously withdrawing a portion of said liquid reactants containing "asphalt", subjecting same to intense hydrogenation conditions at a lower temperature to liquefy said "asphalt", and returning the heavy fractions from said hydrogenation treatment to said destructive hydrogenation process.

4. Process according to claim 2 in which the destructive hydrogenation steps are conducted in the presence of a sulfactive catalyst suitable therefor.

5. Process according to claim 3 in which the "asphalt" content of the liquid reactants in said first destructive hydrogenation zone is maintained within the approximate range of 3 to 15%.

6. Process according to claim 2 in which a suitable catalyst in finely ground form is suspended in the oil in proportion of not more than about 30% by volume of oil and the quantity of oil withdrawn and returned is such that the "asphalt" content of the oil in the primary reaction zone is not over about 25% by volume.

7. Process according to claim 2 in which pressure in both zones is in excess of 50 atmospheres and that prevailing in the second is substantially in excess of that in the first.

8. Process according to claim 2 in which light fractions for the two zones are blended and finished for a motor fuel.

9. An improved process for producing naphtha of high anti-detonation properties comprising destructive hydrogenation of high boiling petroleum under cyclic alternate "asphalt" increasing and "asphalt" reducing conditions and collecting and blending light oils produced in such steps.

EDWIN J. GOHR.